United States Patent [19]

Pirl et al.

[11] Patent Number: 4,571,821
[45] Date of Patent: Feb. 25, 1986

[54] SLEEVE INSERTION

[75] Inventors: William E. Pirl, Penn Township, Westmoreland County; John P. Vogeleer, Hempfield, both of Pa.

[73] Assignee: Westinghouse Electric Corp., Pittsburgh, Pa.

[21] Appl. No.: 526,719

[22] Filed: Aug. 26, 1983

[51] Int. Cl.$^4$ .................. B23P 19/00; B21D 3/04
[52] U.S. Cl. ............................. 29/727; 29/282; 29/157.4; 29/723; 72/164
[58] Field of Search ............ 72/160, 164, 166, 170, 72/173, 175; 29/727, 726, 282, 157.4, 723

[56] References Cited

U.S. PATENT DOCUMENTS

| 2,335,028 | 11/1943 | Rose et al. | 72/173 |
|---|---|---|---|
| 3,116,781 | 1/1964 | Rugelev et al. | 72/160 |
| 3,410,126 | 11/1968 | Baker | 72/164 |
| 4,154,077 | 5/1979 | Cotter | 72/173 |
| 4,201,074 | 5/1980 | Cox | 72/164 |
| 4,286,452 | 9/1981 | Schneider | 72/164 |
| 4,313,793 | 2/1982 | Klumb et al. | 376/260 |
| 4,329,769 | 5/1982 | Glatthorn | 29/727 |

FOREIGN PATENT DOCUMENTS

| 1118576 | 6/1956 | France | 72/161 |
|---|---|---|---|
| 564401 | 9/1944 | United Kingdom | 72/164 |

OTHER PUBLICATIONS

PCT/US82/00934, "Wire Straightener and Method for Straightening Wire", Labbe, R. A., 6/23/1983.

Primary Examiner—Daniel C. Crane
Attorney, Agent, or Firm—L. A. DePaul

[57] ABSTRACT

The hollow tubular member or blank which is to serve as a sleeve for a corroded tube of the steam generator of a nuclear reactor plant and which is too long to be manipulated under the tube sheet of the reactor, is pre-bent into a shape such that it can be manipulated and is then progressively straightened under the tube sheet as it is progressively inserted into the tube. The straightener includes a plurality of grooved rolls mounted staggered and rotatable in a train. Each roll forms a channel engaging half of the periphery of the member. The contour of the engaging surface of each roll is the same as the contour of the member over half of its peripheral surface so that each roll mates with the member over half of its peripheral surface. The rolls are in frictional engagement with the member and advance the member while bending it so that the material of the member is stressed beyond its elastic limit oppositely to the stress beyond the elastic limit, which produced the bending, sufficiently to straighten the hollow member.

5 Claims, 19 Drawing Figures

SLEEVE INSERTION

BACKGROUND OF THE INVENTION

This invention relates to the art of inserting sleeves into tubing and has particular relationship to the insertion of sleeves into the primary tubing of the steam generator of a nuclear reactor plant. This invention has unique utility when integrated into the sleeving of such steam generator tubes. It is however realized that this invention has general utility and to the extent that it is employed in other areas than sleeving of steam generator tubing, such uses within the scope of equivalents of this invention.

In the operation of nuclear power plants it has been found that the primary tubes become corroded. Usually the corrosion is experienced at or near the region where the tubes emerge from the tube sheet into the mixture of water and the steam which is produces. The corrosion problem is met either by sleeving the tubes or by plugging them. The sleeves which are inserted in the tubes are typically 4 to 6 ft. long but may be much longer. In the past the practice has been to sleeve the corroded tubes inwardly from the periphery of the tube sheet. In this region there is adequate depth to manipulate the elongated hollow cylindrical member or sleeve blank which serves as a sleeve. The corroded tubes near the periphery of the tube sheet, where a straight cylindrical member cannot be readily manipulated, were plugged. The plugging has the serious drawback that there is a loss in the available power output from the plant for each plugged tube. A loss of 15% in available power has been experienced from the plugging of tubes near the periphery.

Prior to this invention consideration was given to attempting to sleeve tubes in regions of the steam generator, where the cylindrical member is too long to be manipulated, by pushing the member through a bender within the steam generator, then through a straightener and then into the tube. This approach was found not to be practicable because it demanded too high a force to be exerted on the member. The impracticability was exacerbated by the usual requirement that the sleeving be composed of the hard high nickel-chromium alloy sold under the name INCONEL. Typically the sleeving member is composed of INCONEL-600 which is sold by Huntington Alloy Products Division of International Nickel Corporation and has the following typical composition in weight percent:

Ni—72 minimum
Cr—14–17
Fe—6–10
C—0.15 maximum
Mn—1.0 maximum
S—0.015 maximum
Si—0.5 maximum
Cu—0.5 maximum It was found that under no conceivable circumstance could the tubes be sleeved by pushing a member of this material into a tube through a bender and a straightener within the steam generator.

It is an object of this invention to provide apparatus whose practice and use shall lend itself to the practicable and effective sleeving of the tubes of a steam generator, or tubes generally, particularly with sleeve blanks of hard high nickel-chromium alloys, regardless of how long the sleeve blanks are and how limited the dimensions of the region in which the blanks are to be manipulated. This object is directed not only to practicable and effective sleeving of tubes near the periphery of the tube sheet of a steam generator but to the sleeving with long blanks well within the periphery.

SUMMARY OF THE INVENTION

In accordance with this invention the cylindrical member or sleeving blank is prebent outside of the steam generator and then progressively straightened within the generator and fed into the tube to be sleeved progressively and it is straightened. As prebent the cylindrical member has a straight leading end which serves to start the member into the tube. Depending on the length of the member and the depth of the steam generator where a tube is to be sleeved, the configuration of the member may vary from a simple curve to a helix with several turns. In prebending the member, its material is stressed beyond the elastic limit in one sense. When the member is straightened, it is stressed beyond the elastic limit in the opposite sense, i.e., with stress of opposite polarity to the prebending stress. To minimize the final stress (technically strain) in the sleeve after straightening, the cylindrical member may be stress relieved by heat treatment after it is prebent.

A straightener for operation within the steam generator to straighten the member is provided in accordance with this invention. This straightener includes a plurality of power-or-manually driven rolls mounted in a chain so that alternate rolls in the chain successively engage opposite surfaces of the cylindrical member. The rolls exert the necessary pressure on the prebent member to stress it beyond the elastic limit in the opposite sense to the stress which produced the prebending. The straightening stress must be such that the member springs into straight configuration and remains in this configuration and is not bent in the opposite sense to the prebending. The leading roll, i.e., the lower roll when the straightener is in operation, is adjustably pivotal about the axis of the just succeeding roll. The straightening pressure is determined by the angular position of the pivotal roll with reference to the just succeeding roll. The pivotal roll is set and locked in an angular position such that the proper pressure to straighten the member is applied. Typically the setting may be effected by passing test pieces of prebent members through the straightener and pivoting the roll to different positions until the test pieces are seen to be straightened. Under certain circumstances the trailing roll, i.e., the top roll when the straightener is in operation may be the pivotal roll. The adjustable roll is pivoted away from the member for initial feeding of the member through the straightener and is then forced back into predetermined pressure engagement with the member and locked in position.

The rolls may be rotated by a hand crank or by a motor. The motor drive is preferred since the motor may be energized remotely, thus minimizing the time to be spent by personnel in the radioactive environment under the tube sheet, i.e. in the channel head of the steam generator. One roll is driven; the other rolls are geared to each other so that they are rotatable by the drive together.

The rolls frictionally engage the member and pull it through the straightener. The frictional force is maximized by shaping the contour of the engaging surface of each roll so that it is the same as, and mates with, the engaged surface of the cylindrical member. The frictional force is concentrated at the engaging surfaces between the member and the rolls by driving the rolls through antifriction bearings.

In use, the straightener is pivotally suspended from the tube sheet near the tube to be sleeved. The leading roll is pivoted away from the succeeding roll and the cylindrical member with the straight section leading is inserted between the rolls and started into the tube to be sleeved. The pivotal roll is forced against the member and locked in the proper position where it exerts the proper straightening pressure on the member. The rolls are rotated and drive the cylindrical member into the tube. When the end of the sleeve is at the level of the leading roll the rotation is stopped. The pivotal roll is unlocked and swung to open position. The straightener is removed and the sleeving is completed by pushing the remainder of the cylindrical member home into the tube to be sleeved. The straightener operates with the axis of the cylindrical member in one plane. Where the member is of helical configuration, the axis of the part of the member emerging from the turn of the helix (uppermost or lowermost turn), which is being fed into the straightener, is in this plane.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF THE INVENTION

Figure 1:
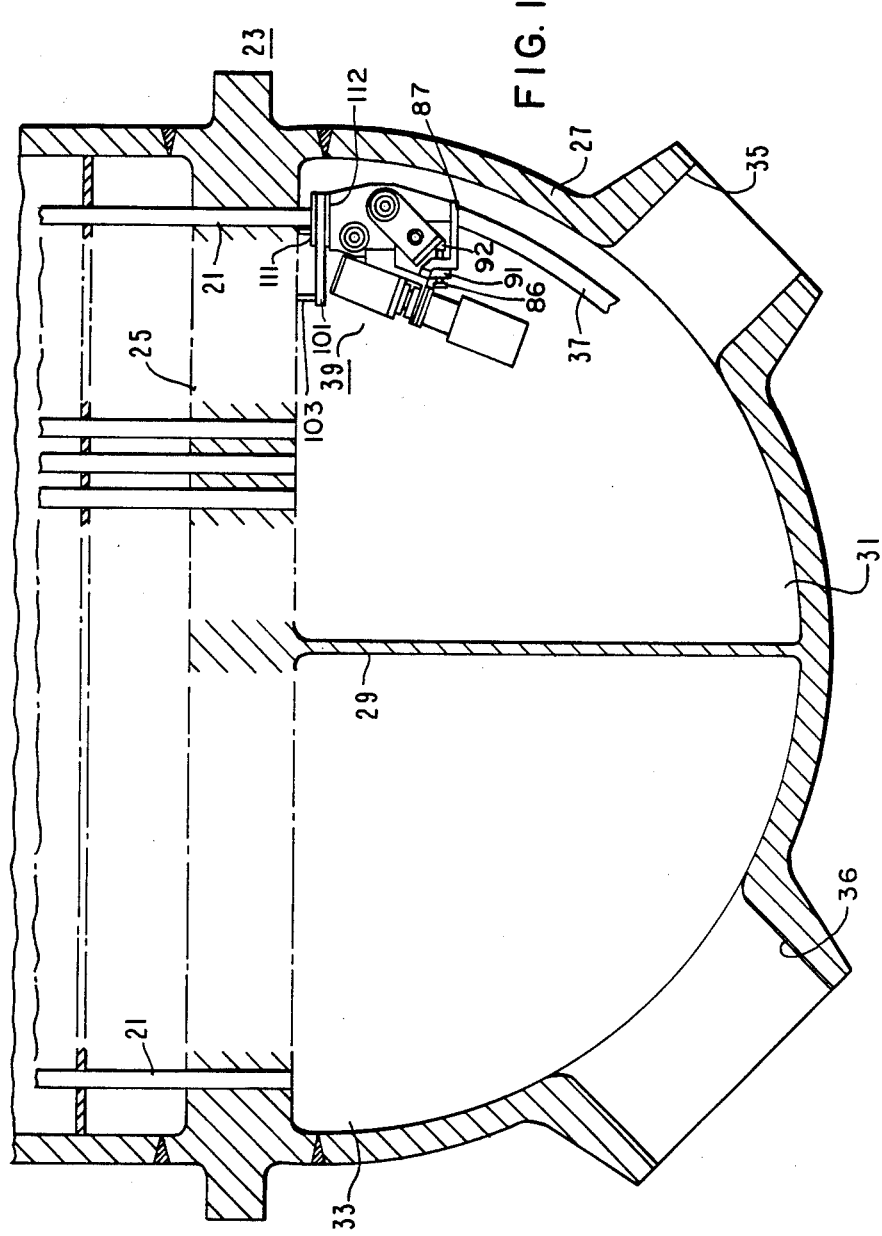
FIG. 1 is a fragmental view in longitudinal section, partly diagrammatic, showing the lower portion of a steam generator with a straightener positioned therein to sleeve a tube in accordance with this invention.

In the practice of this invention tubes 21 of a steam generator 23 are sleeved. The steam generator 23 has the shape of a generally circular cylinder closed at the bottom by a tube sheet 25 from which a bowl-shaped channel head 27 extends. The tubes 21 are seal welded to the lower surface of the tube sheet 25. The space defined by the member 27 is divided, by a partition 29, into an inlet plenum 31 and an outlet plenum 33. The tubes 21 are of U-shape and extend through the tube sheet 25 into the cylinder, spanning the partition 29 with one leg opening into plenum 31 and the other into plenum 33. Coolant from a nuclear reactor enters a port 35 to the inlet plenum 31, flows upwardly through the legs of the tubes 21 communicating with plenum 31, then downwardly through the other legs to the outlet plenum 33 whence it is conducted through a port (not shown) back to the reactor. The bowl-shaped member 23 also has manholes 36 (one not shown) in the inlet and outlet plenums through which it may be entered by servicing personnel with tools and parts. Typically the tube sheet 25 has a thickness of about 21 inches and is composed predominantly of mild steel. The tubes 21 are typically composed of INCONEL alloy. The tubes 21 constitute the primary conductors of the generator. They transfer the heat from the coolant to water in the cylinder which is converted into steam.

It has been found that some tubes 21 become corroded particularly at the internal joints between the tubes 21 and the tube sheet 25. Such corroded tubes are sleeved or plugged. However, plugged tubes do not conduct coolant and to the extent that they are plugged, the efficiency of the nuclear reactor plant is reduced. It is then desirable to sleeve all corroded tubes. This invention enables the sleeving of tubes 21 which open into regions, of the inlet or outlet plenums 31 or 33, that are of insufficient depth to accommodate for sleeving the lengths of the tubes required. Such regions may be near the periphery of the plenums or, when the hollow cylindrical members or blanks which serve as sleeves are very long, nearer the center.

In the practice of this invention each cylindrical member 37 which is to serve as a sleeve is prebent into a shape outside of the generator 23 such that, as bent, it is of sufficient length to be manipulated for sleeving within the inlet or outlet plenums. The prebent member 37 is then progressively straightened by a straightener 39 suspended from the tube sheet 25 in the region of the tube 21 to be sleeved and is progressively inserted into the tube as it is straightened. The sleeving operation of this invention requires that the bent member be stressed beyond the elastic limit for the prebending and then be stressed in the opposite sense beyond the elastic limit so that it becomes straight.

Figure 6:
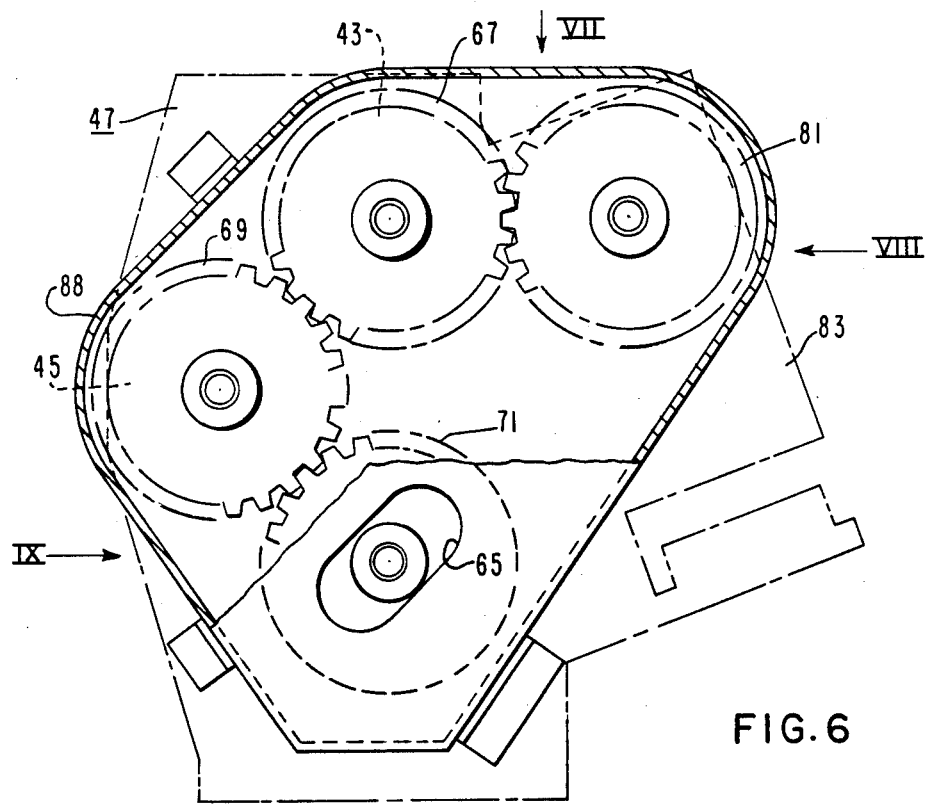
FIG. 6 is a partial view in side elevation of the straightener as seen from the side opposite to the gearing.
Figure 9:
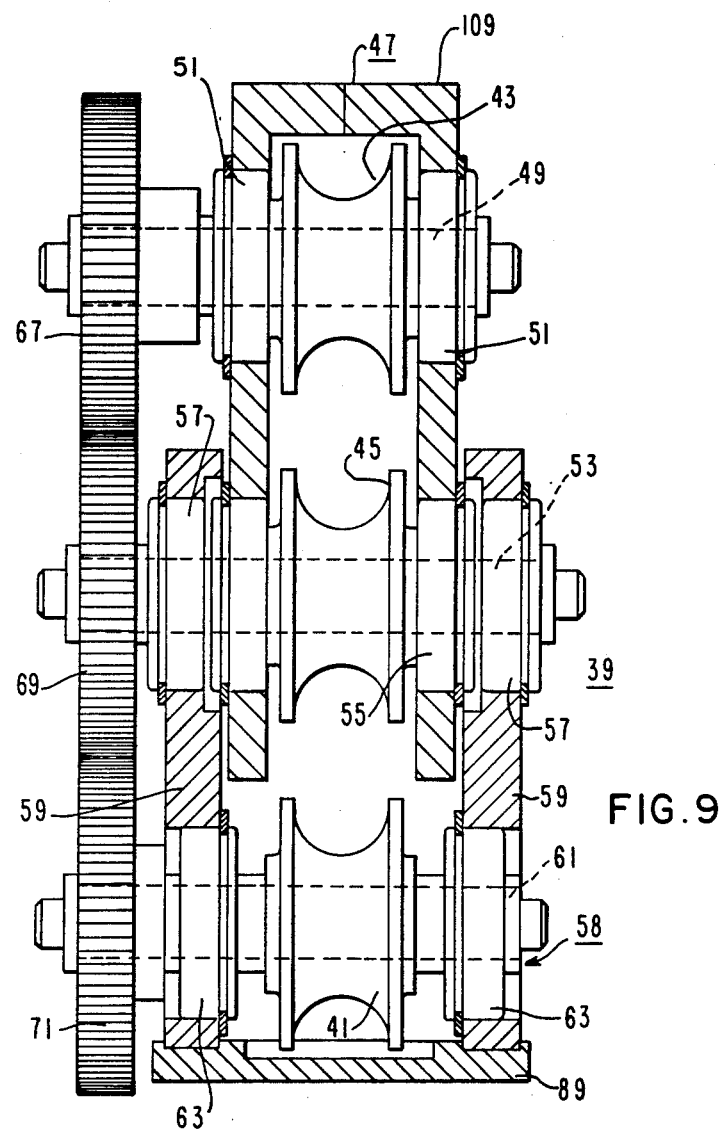
FIG. 9 is a view in section taken along lines IX—IX of FIG. 6.
Figure 10:
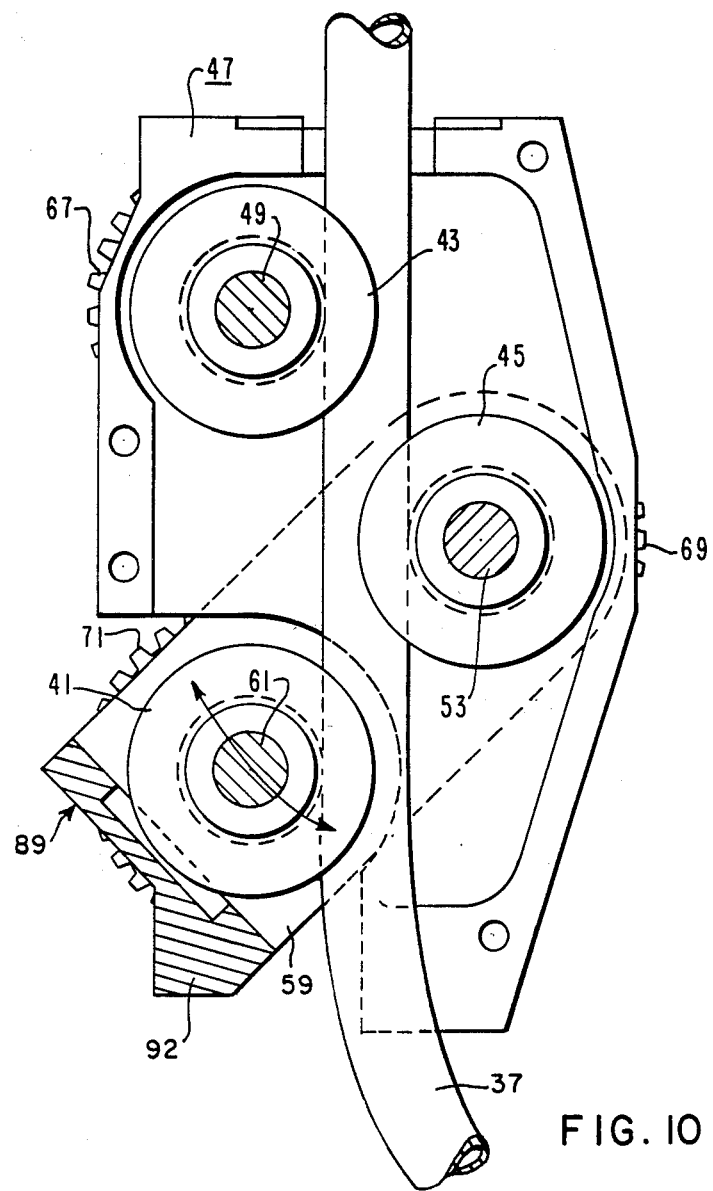
FIG. 10 is a diagrammatic view showing the manner in which the cylindrical member is engaged by the rolls of the straightener according to this invention.
Figure 14:
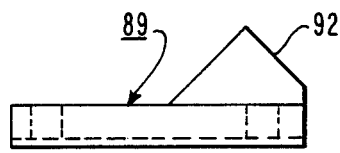
FIG. 14 is a view in end elevation of the connector taken in the direction XIV of FIG. 12.
Figure 12:
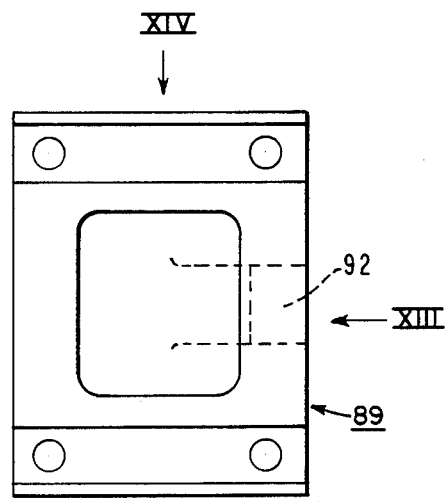
FIG. 12 is a plan view of the connector or plate between the links or yokes which is actuated to position the pivotal-roll assembly angularly.
Figure 13:
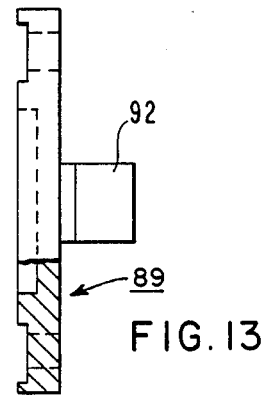
FIG. 13 is a view in side elevation of the connector taken in the direction XIII of FIG. 12.

The straightener 39 includes a plurality of rolls which may be identified as a leading roll 41, a trailing roll 43 and an intermediate roll 45 (FIG. 9). The rolls 41, 43, 45 are mounted in a box-like housing or bracket 47 (FIGS. 4, 5A, 5B, 5C, 5D, 9). The trailing roll 43 is keyed to a shaft 49 (FIG. 9) which is rotatable in ball bearings 51 supported in housing 47. The intermediate roll 45 is keyed to a longer shaft 53 which is rotatable in an inner set of ball bearings 55 and an outer set of ball bearings 57 also supported in bracket 47. The leading roll 41 is part of an assembly 58 which is suspended pivotally on links or yokes 59 from the outer shells of the bearings 57. This roll 41 is keyed to a shaft 61 which is rotatable on ball bearings 63. Each yoke 59 has an upper opening (with reference to FIG. 9) whose inner boundary engages and is pivotal on an outer shell of bearing 57 and a lower opening whose boundary engages firmly the outer shell of bearing 63. The housing 47 has slots 65 (FIG. 6) to permit the pivoting of the leading roll assembly 58. On extensions of each shaft 49, 53 and 61 there are gears 67, 69 and 71. Gear 67 is driven and rotates shaft 49 and roll 43. Gear 67 meshes with, and drives, gear 69 driving shaft 53 and roll 45. Gear 69 meshes with, and drives, gear 71 driving shaft 61. Gear 71 is also capable of rolling along gear 69 as the assembly 58 is pivoted.

The gear 67 is driven by a gear 81 in turn driven by a motor 83 (FIGS. 2, 4, 5) through a gear chain 84 (not shown in detail). To minimize danger to personnel which may be in the bowl or channel head 27 the motor 83 is energized by a 24 DC volt supply. The power delivered by this motor is substantially smaller than for 110 volt motor. The use of anti-friction bearing 51–63 enables substantially the full power of the motor to be applied to the straightening operation. Typically 15 pounds of force are required to operate the rolls 41, 43, 45. With antifriction bearings a total of about 25–30 pounds is required to drive the rolls and bend sleeve blank. With sleeve bearings several hundred pounds would be required. The motor 83 is mounted in a bracket 85 which is suspended from housing 47. The gears 67, 69, 71 and 81 are encompassed by a personnel guard 86.

Figure 11:
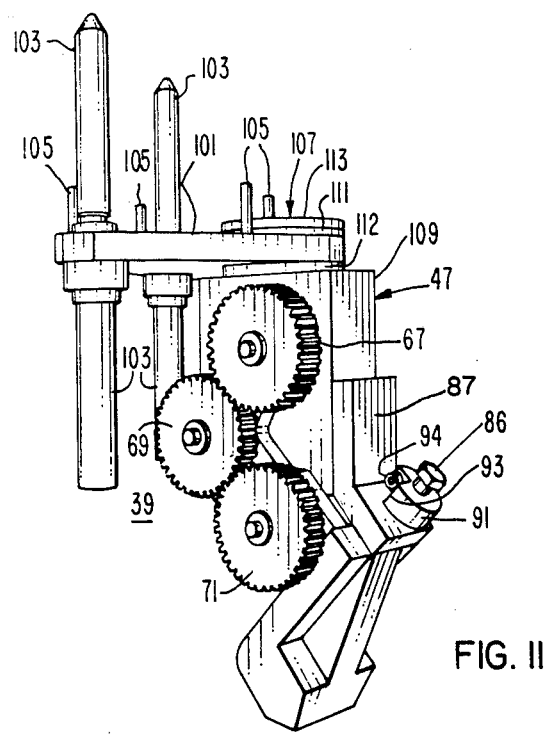
FIG. 11 is a copy of a photograph of a straightener in accordance with this invention showing the mechanism for the angular positioning of the pivotal-roll assembly.
Figure 4:
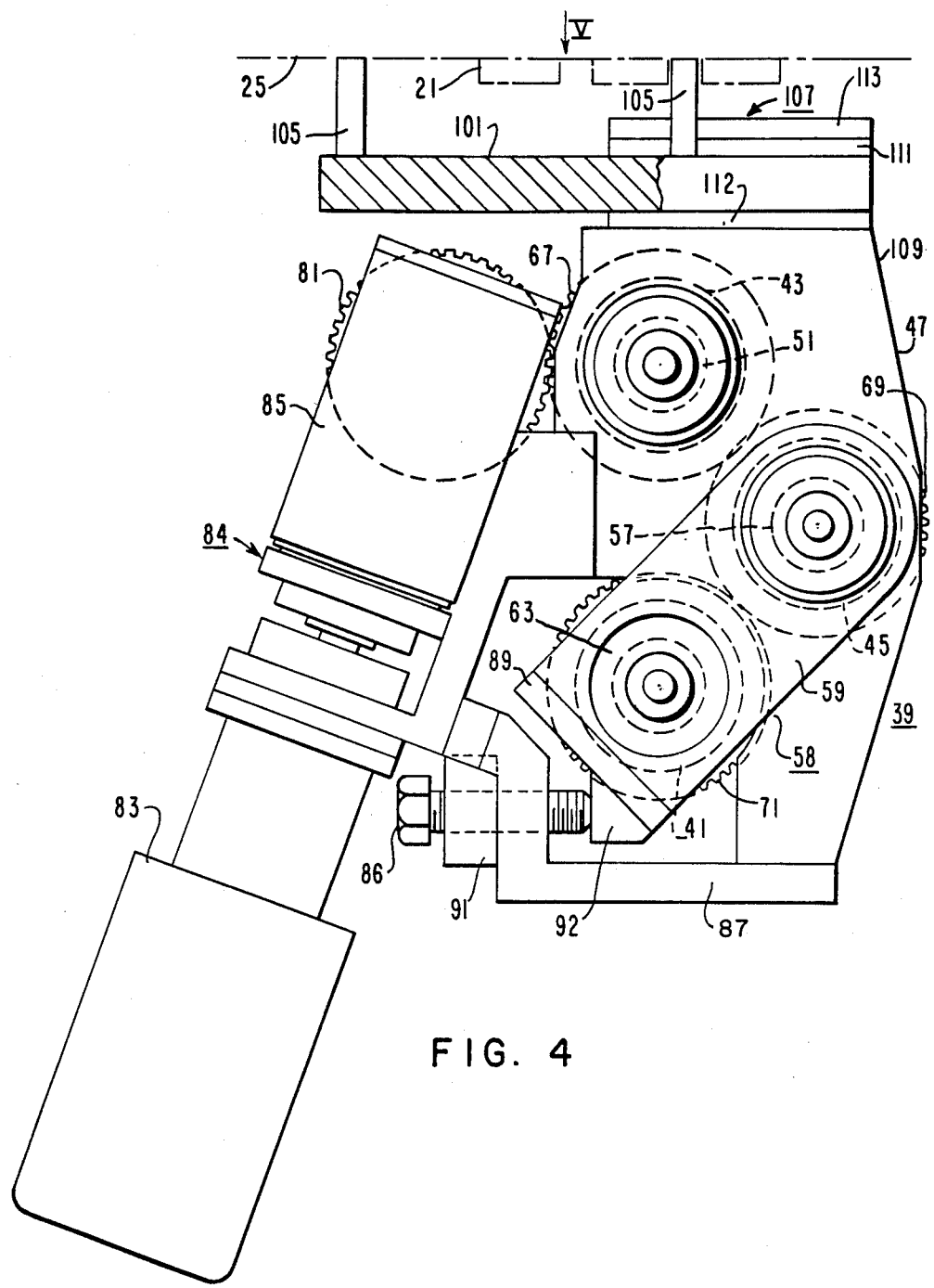
FIG. 4 is a view in side elevation of the straightener shown in FIG. 2 as seen from a position looking towards the gearing.

The assembly 58 is set in the proper angular position by a bolt 86 which is screwed into a bracket 87 secured to housing 47 (FIGS. 4, 11). The bolt engages a link or yoke connector 89 bolted between the links or yokes 59 at their lower ends (FIGS. 4, 12, 13, 14). The bolt 86 passes through a collar 91. The connector 89 has a projection or cam 92 (FIGS. 4, 12, 13, 14) where it is engaged by the tip of bolt 86. The collar 91 is split (FIG. 11) and has a radial indentation 93 where a set-screw 94 is provided so that once the angular position of assembly 58 is known the collar can be clamped to the bolt. After the assembly 58 is pivoted outwardly to permit the cylindrical member to be inserted, the angular position of the assembly 58 may be set by screwing in the bolt until the collar 91 engages bracket 87.

Figure 2:
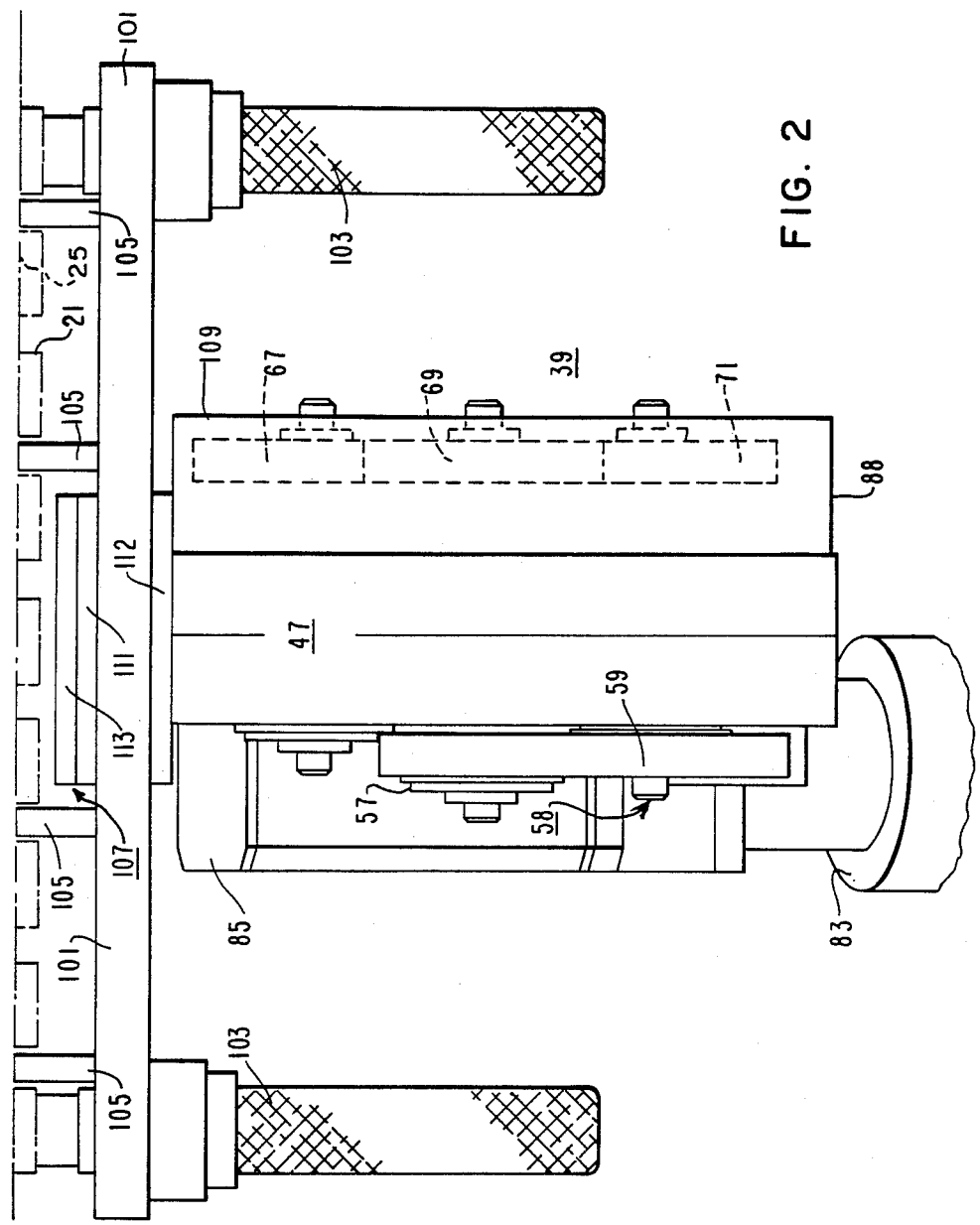
FIG. 2 is a view in front elevation of a straightener in accordance with this invention suspended from a tube sheet in sleeving position.
Figure 3:
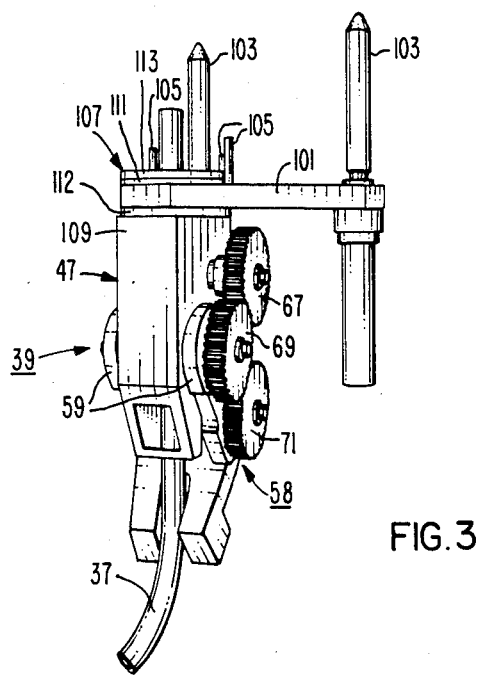
FIG. 3 is a copy of a photograph of the straightener shown in FIG. 2 without the drive and with the straight end of a helically bent cylindrical member therein.
Figure 5:
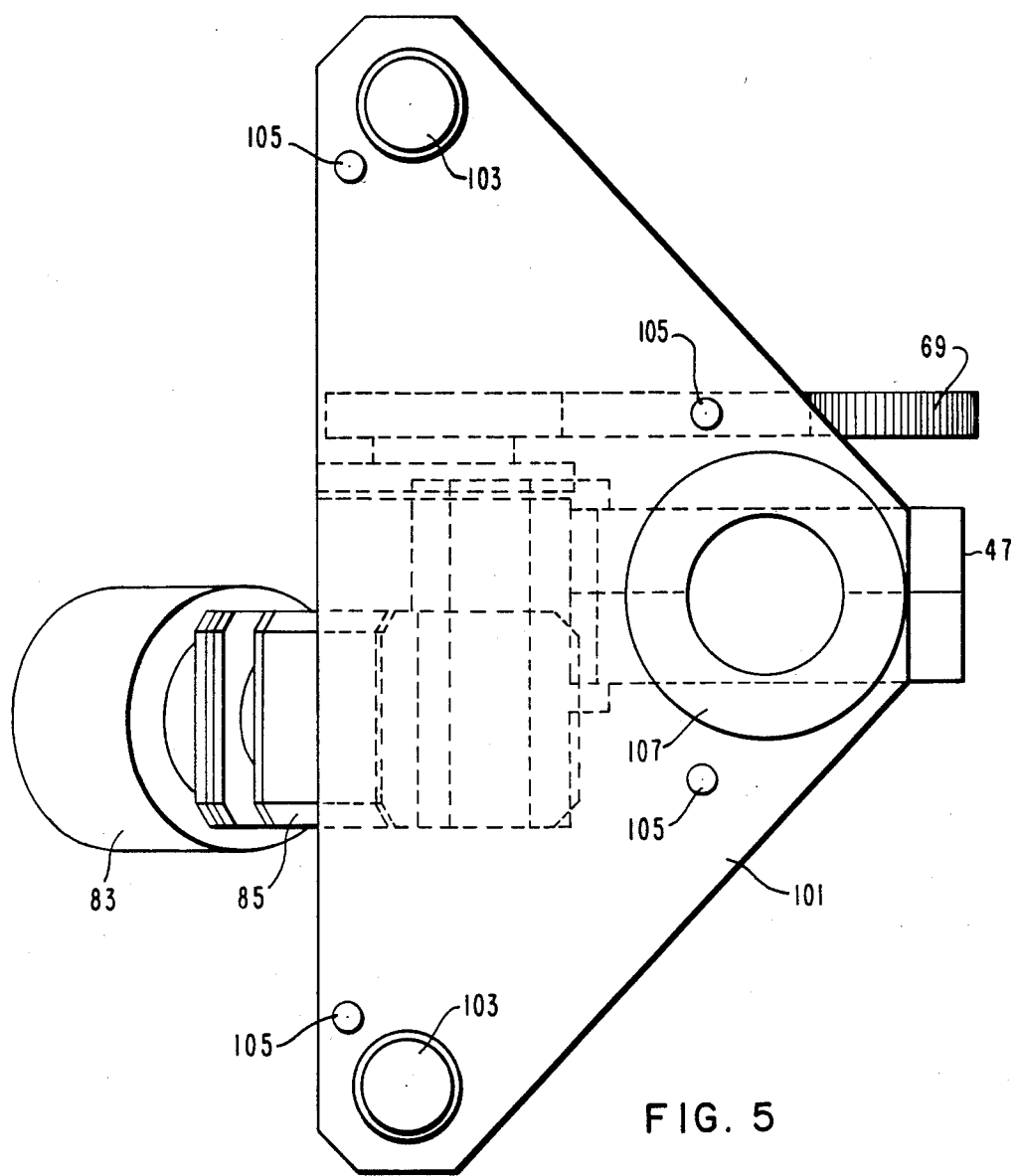
FIG. 5 is a plan view of the straightener as seen in the direction V of FIG. 4.
Figure 5A:
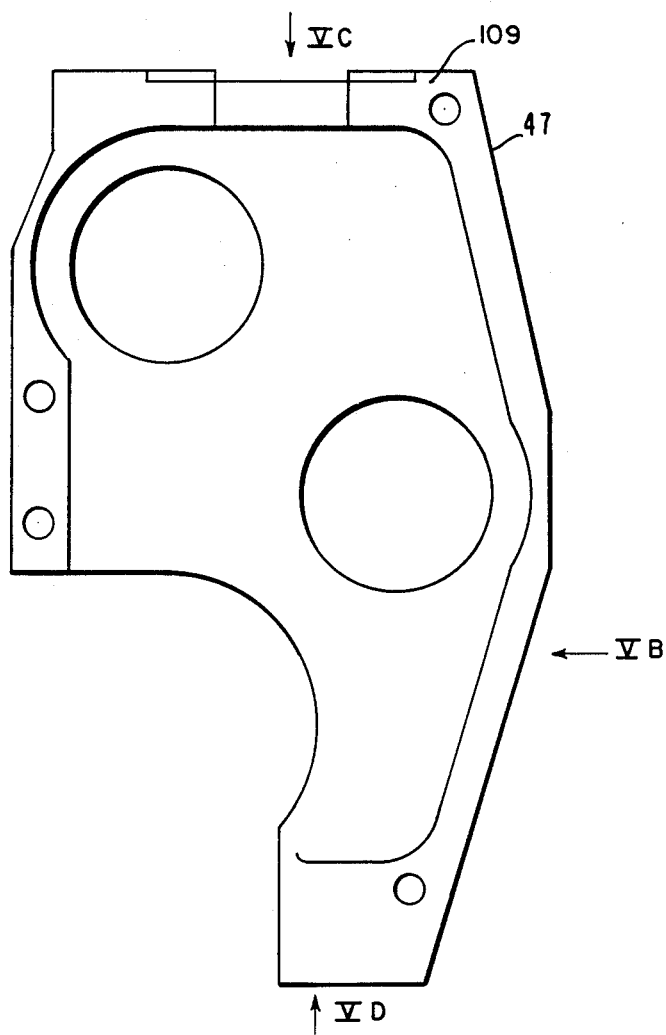
FIG. 5A is a view in side elevation of the housing for supporting the rolls, gears and motor of the straightener shown in FIG. 2.
Figure 5B:
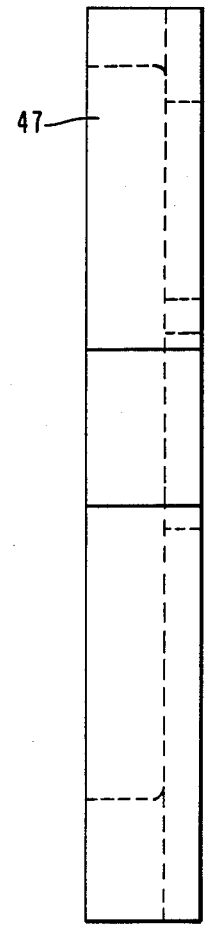
FIG. 5B is a view in end elevation of the housing taken in the direction VB of FIG. 5A.
Figure 5C:
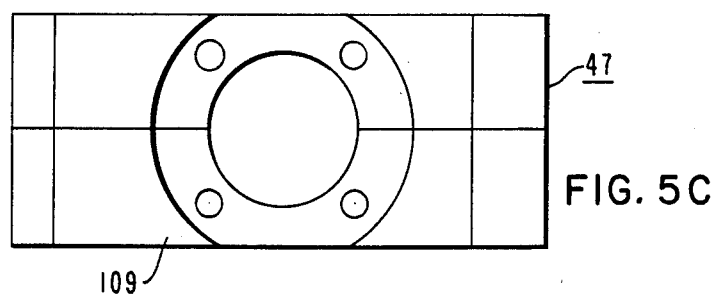
FIG. 5C is a plan view of the housing taken in the direction VC of FIG. 5A.
Figure 5D:
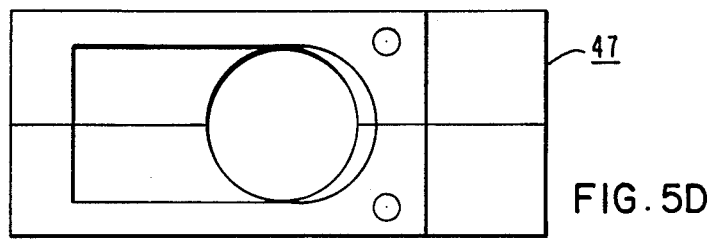
FIG. 5D is a plan view of the housing taken in the direction VD of FIG. 5A.
Figure 8:
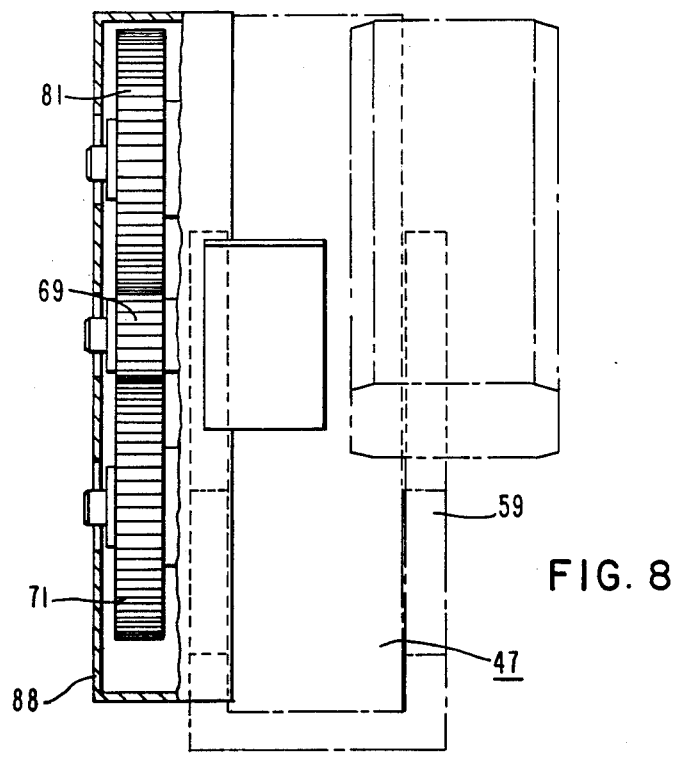
FIG. 8 is a view in end elevation of the straightener taken in the direction VIII of FIG. 6.
Figure 7:
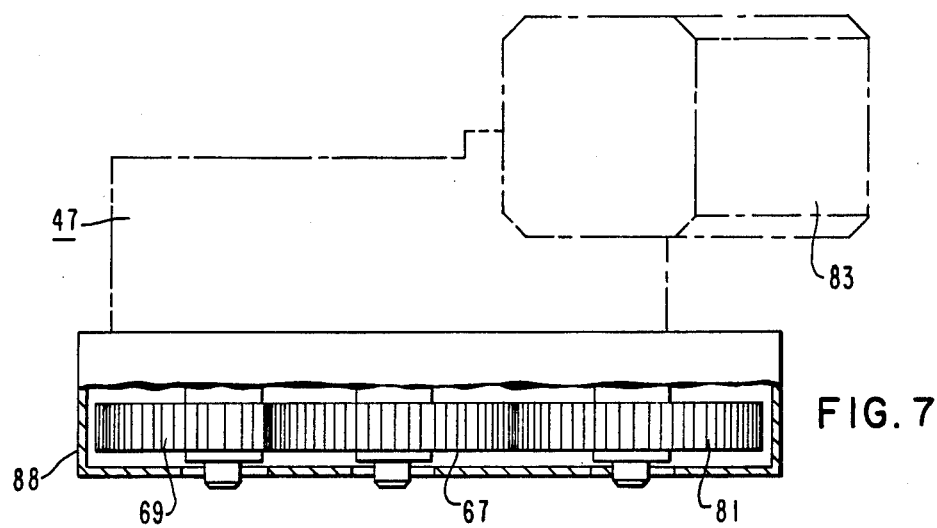
FIG. 7 is a view in end elevation of the straightener taken in the direction VII of FIG. 6.

The housing 47 and its components including the rolls 41–45, the gears 67–71, and the motor 83, is pivotally suspended from the tube sheet 25 on a generally triangular plate 101 (FIGS. 2, 5). CAM-LOC connectors 103 extend through the plate near the apices of one side of the triangle. Spacer rods 105 for positioning the plate parallel to the tube sheet project from the surface of plate 101. The housing 47 is pivotally connected to plate 101 by a flanged cylinder or sleeve 107 which is secured to the upper cover 109 of housing 47 (FIGS. 2, 3, 4, 5C, 11). The cylinder 107 extends through an opening in plate 101 whose boundary serves as a bearing for the cylinder. Washers 111 and 112 are interposed between the flange 113 of the cylinder 107 and between the plate 101 and the cover 109.

Figure 15:
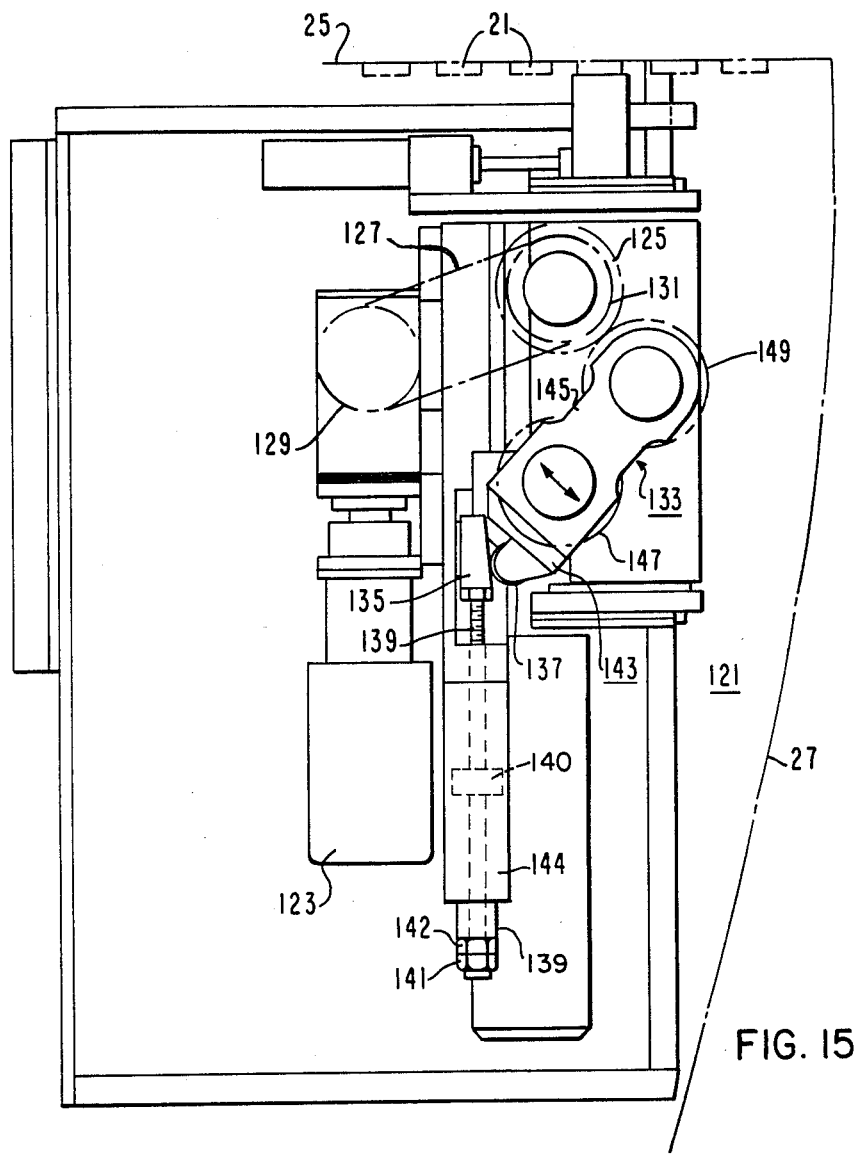
FIG. 15 is a view in side elevation of a modification of the straightener according to this invention.

In the straightener 121 shown in FIG. 15, the motor 123 drives the gear 125 for the trailing roll through a chain 127 which interconnects a sprocket wheel 129 driven by the motor and a sprocket wheel 131 on the shaft of gear 125. In addition the angular position of the pivotal assembly 133 which carries the leading roll is set by the cooperation of a cam 135 and a cam follower 137. The cam 135 is secured to the end of a piston rod 139 which is threaded at its lower end. The piston rod 139 is moveable by piston 140 in hydraulic cylinder 144. The cam follower 137 is a roller centrally mounted on a link connector 143 secured to the ends of links 145. As the cam 135 is moved upwardly or downwardly the assembly 133 swings counterclockwise or clockwise (with respect to FIG. 15) with gear 147 on the shaft of the lead roll rolling in mesh with gear 149 on the shaft of the intermediate roll. Gear 149 is driven by gear 125 and drives gear 147. The piston rod 139 carries nuts 141 and 142 at its lower end. Nuts 141 and 142 may be locked together, i.e., turned into contact with each other, setting the piston rod and the cam 135 in a selected position. To position the cam with reference to the cam follower 137, the nuts 141 and 142 are unlocking, i.e., turned out of contact with each other. Then nut 141 is rotated to move the cam 135 upwardly or downwardly. Initially a prebent test piece is passed through straightener 121 and the setting of the cam 135 at which it is straightened is determined. At this point nuts 141 and 142 are locked. Preparatory to the insertion of the cylindrical member 37, the piston 140 is driven downwardly moving rod 139 and cam 135 downwardly and retracting the pivotal assembly 133. The member 37 is then inserted in the straightener and in a tube 21. The piston 139 is then reset to the initial position raising the cam 135 to the predetermined setting.

In the practice of this invention the cylindrical member 37 is bent so that it can be manipulated in the space under tube sheet 25 which is available. The desired position of the collar 91 or the cam 135 is then set by straightening test pieces. The straightener 39 or 121 is then suspended from tubes 21 of the tube sheet 25 adjacent to the tube to be sleeved. The assembly 58 or 133 is then set in the retracted or open position and the member 37 with the straight portion leading is then passed through the straightener 39 or 121, the straightener is pivoted to the appropriate position and the straight leading end of member 37 is injected into the tube to be sleeved. The motor 83 or 123 is energized and the sleeving proceeds. When the end of the member 37 is level with the leading roll, the straightener is removed and the member is fully thrust into the tube 21. The ability of the straightener to pivot about the plate 101 enables the straightener to adjust itself to allow the member 37 to be located so as to clear channel head 27 and partition 29 in any location in tube sheet 25.

While preferred practice and preferred embodiments of this invention have been disclosed herein, many modifications thereof are feasible. This invention is not to be restricted except insofar as is necessitated by the spirit of the prior art.

We claim:

1. For use with a steam generator having an enclosure, a channel head extending outwardly of said enclosure, a tube sheet interposed between said enclosure and channel head, and tubes extending through said tube sheet between said channel head and said enclosure for conducting heated fluid which is converted into steam in said enclosure by heat exchange with said fluid, certain of said tubes being damaged, each said damaged tube to be sleeved by an elongated hollow cylindrical member bent, by deflection of the member beyond the elastic limit of its material, so that it can be manipulated for sleeving within the dimensional limitations of said channel head; apparatus for sleeving each said damaged tube, the said apparatus including a plurality of rolls, means mounting said rolls rotatable, in a train in staggered relationship, there being in said train, a leading roll, a trailing roll and at least one intermediate roll, an inlet to said train, connected to said leading roll, for receiving said bent cylindrical member, said cylindrical member as it is advanced through said train from said inlet to be engaged by each of alternate rolls over opposite portions of its peripheral surface, said rolls being so spaced as to stress the member from the point beyond the elastic limit of the material of said member produced by the bending, to a point in the opposite sense beyond said elastic limit at which the bending is counteracted and the member is straightened, an outlet from said train for the straightened member, means, connected to said mounting means, for suspending said train of rolls pivotally therefrom, means on said suspending means for aligning said outlet with the damaged tube to be sleeved so that the straightened member is capable of being advanced as a sleeve into said damaged tube and for engaging tubes in the neighborhood of the damaged tube to be sleeved, for suspending the train of rolls and drive means, mounted on said mounting means, for rotating said rolls to advance said cylindrical member through said train between said inlet and said outlet and into said damaged tube as a sleeve.

2. The apparatus of claim 1 wherein the cylindrical member is advanced into the damaged tube by the frictional force exerted by the rolls on the member and wherein the channel of each roll for the member has a surface to be engaged by the member which has substantially the same contour as the surface of the member which is to be engaged so that the rolls engage the member over substantially the whole associated portions of the surfaces of the member whereby the frictional force between the member and the rolls is maximized and the member is readily advanced into the damaged tube.

3. The apparatus of claim 2 wherein the rolls are mounted rotatable on anti-friction bearings whereby the effect of the driving frictional force between the rolls and the cylindrical member for advancing the member into the damaged tube is maximized and the frictional bearing losses are minimized so there is adequate power for driving the member into the damaged tube as a sleeve.

4. The apparatus of claim 1 wherein the angular position of the leading roll of the chain with reference to the just succeeding roll is adjustable in accordance with the bend in the member and the elastic properties of the material composing the member so that the member is effectively straightened.

5. The apparatus of claim 1 wherein the suspending means includes a plate to be connected to the tube sheet having a sleeve extending through said plate rotatable in said plate, the rolls and the drive being suspended from said sleeve.

* * * * *